A. VESTER.

Bracelet.

No. 9,526. Reissued Jan. 4, 1881.

Attest:

R. F. Barnes

Frank Middleton

Inventor:

Adolph Vester

By Ellis Spear

Atty

N. PETERS, PHOTO-LITHOGRAPHER, WASHINGTON, D. C

UNITED STATES PATENT OFFICE.

ADOLPH VESTER, OF NORTH ATTLEBOROUGH, MASSACHUSETTS.

BRACELET.

SPECIFICATION forming part of Reissued Letters Patent No. 9,526, dated January 4, 1881.

Original No. 228,425, dated June 1, 1880. Application for reissue filed October 29, 1880.

*To all whom it may concern:*

Be it known that I, ADOLPH VESTER, of North Attleborough, in the county of Bristol and State of Massachusetts, have invented a new and useful Improvement in Bracelets; and I do hereby declare that the following is a full, clear, and exact description of the same.

My invention relates to bracelets of that class in which the bracelet is composed of two wings, hinged to open so as to be placed upon or be removed from the wrist, and held in place by a spring.

The object is to simplify the construction and improve the appearance of the bracelet.

The invention consists, principally, of a spring held in a tubular portion or bent flange of the end of one part of the bracelet, adapted to hold the body of said spring and to fit the opposite end of the other part of the bracelet, to which it is hinged, the end of the spring also entering said opposite part.

Figure 1:
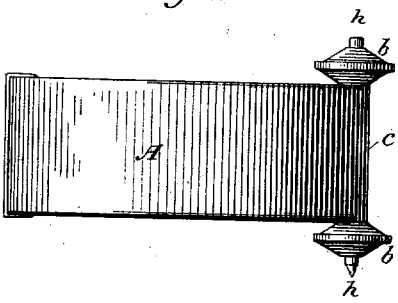
Figure 2:
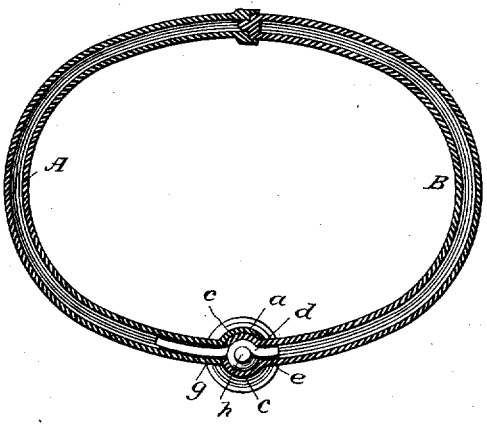
Figure 3:
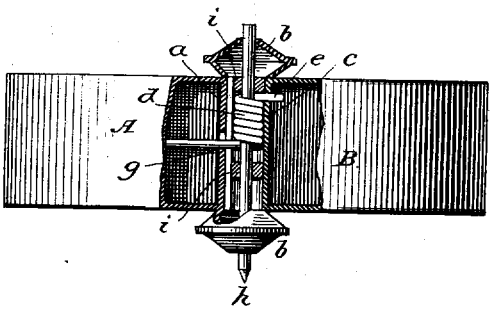

In the drawings, Figure 1 shows a side elevation of my improved bracelet; Fig. 2, a section lengthwise through the bracelet, and Fig. 3 a top view of the hinge, with the outer part broken away to show the construction and arrangement of the spring.

In these drawings, A represents one-half of a bracelet, on which, at that end which is hinged to the other part, a lip is formed in the shape of a curved flange extending across the width of the bracelet, as shown at *a*. This flange forms a part of the hinge on which the movable part is held. At each end of this flange is a boss, *b*, the center of these bosses being concentric with the curve of the flange.

The movable part B of the bracelet is provided at the hinged end with two curved flanges, *c c*, or a tubular portion placed across the end of the part B and adapted to fit into the curved flange *a* and between the bosses *b*.

The flanges *c c* may be formed of a single piece of metal, bent so as to nearly meet, and soldered to the end of the part B. Within this tubular portion a coiled spring, *d*, is placed. One end, *e*, of this spring is prolonged and extends into the part B, whereby it is held securely from turning. It may, however, be held in other ways, though this is the more convenient.

The spring extends from one side to near the middle of the bracelet, and the inner end is extended through a slit or notch in the parts *c c*, and when the parts are in place passes into a hole, *g*, in the part A.

A pin, *h*, passes through the bosses at the center and through the spring in the tubular part of B, thus securing the two parts together by a hinged connection.

The parts *c c* may be strengthened by short sections *i i* of tube, which fit snugly therein.

The bosses serve as ornaments as well as to support and cover the hinged connection.

The bracelet may be ornamented in any suitable manner.

The joint-connection is simple and the spring is perfectly concealed.

The bosses may be modified in shape, and may be of any desired size.

Having thus described my invention, I claim—

1. The combination, in a two-part bracelet, of a transverse tubular or flanged end of one part adapted to the opposite end of the other part, and forming a hinge therewith, and of a spring inclosed in said tubular or flanged end, and having its end projecting into the said opposite part of the bracelet, substantially as described.

2. In a two-part bracelet, the combination of the spring inclosed in the tube or flanges *c c*, and adapted to extend into the other part of the bracelet, with the flange *a*, adapted to receive the said tubular part, and with a pin, *h*, as set forth.

3. The combination of the flange *a*, bosses *b b*, flanges or tubes *c c*, and spring *d*, as and for the purposes set forth.

ADOLPH VESTER.

Witnesses:
E. A. CRAWFORD,
F. M. BEEBE.